INVENTOR.
RICHARD D. BOGNER

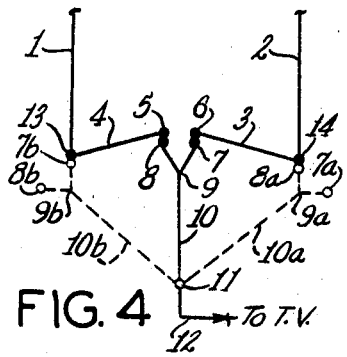
FIG. 4
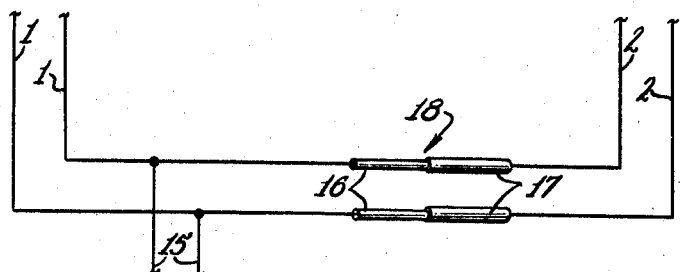
FIG. 5
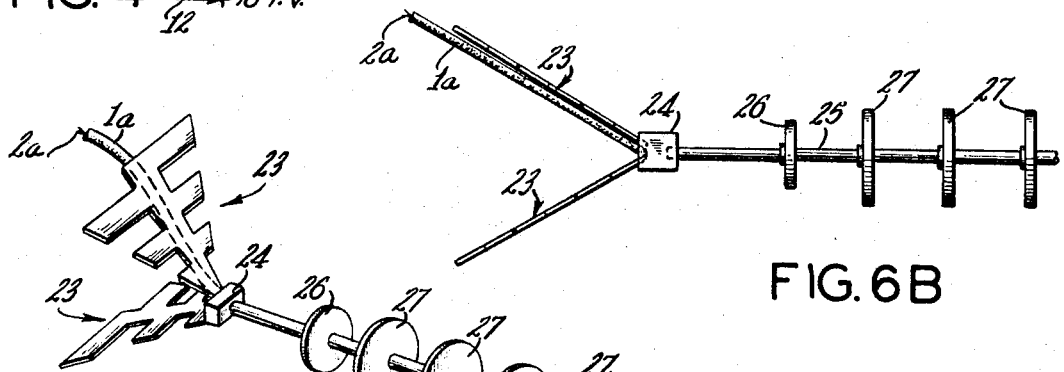
FIG. 6B
FIG. 6A
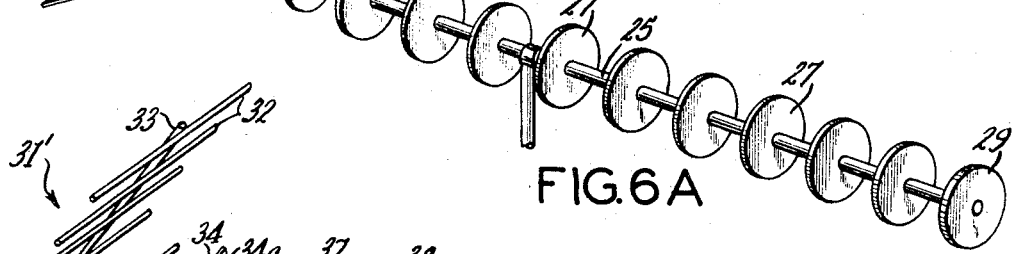
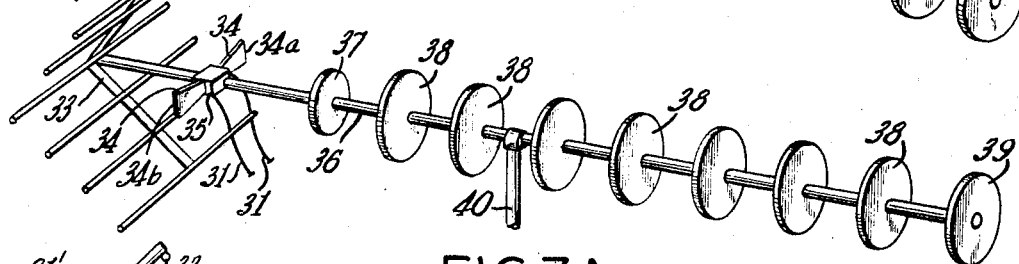
FIG. 7A
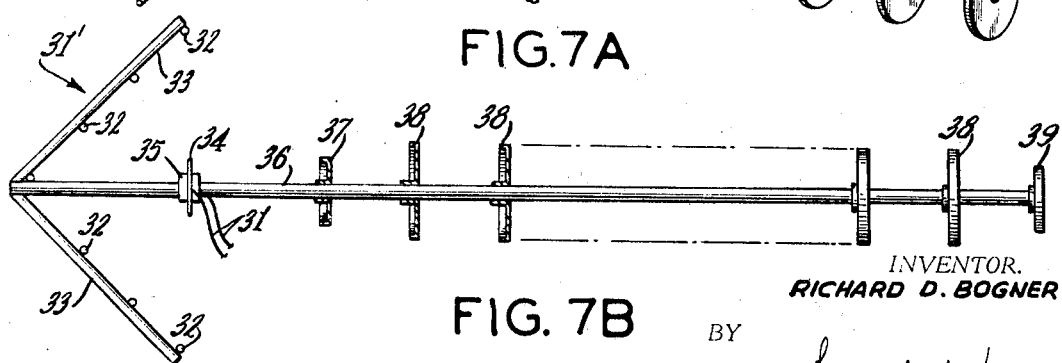
FIG. 7B

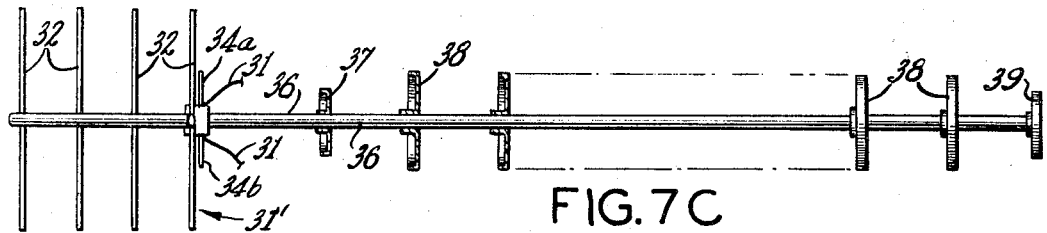
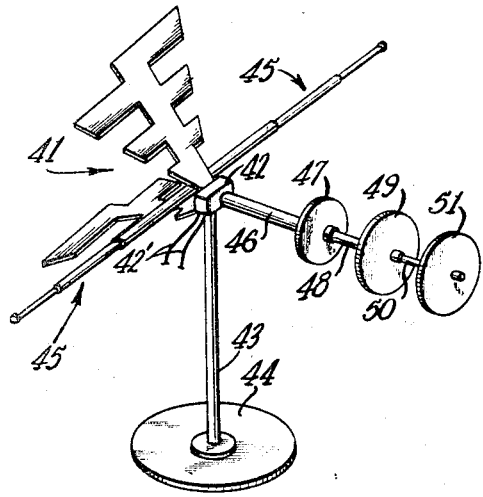
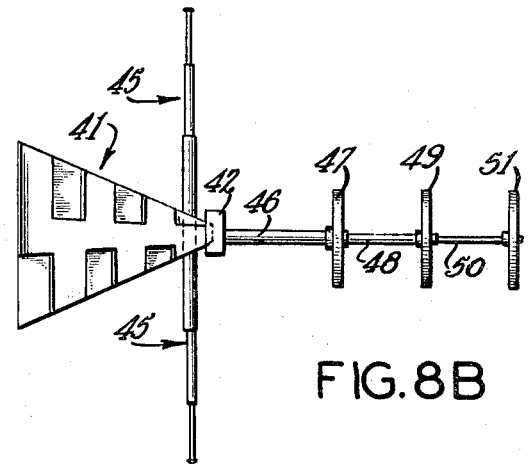
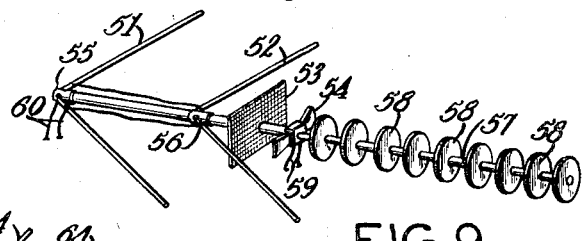
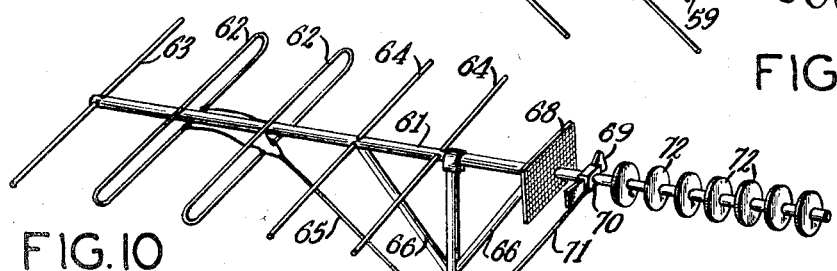
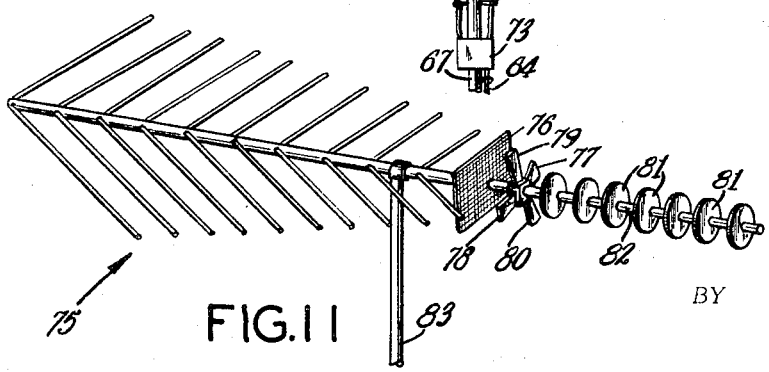
FIG.7C
FIG.8A
FIG.8B
FIG.9
FIG.10
FIG.11
INVENTOR.
RICHARD D. BOGNER

BY Leonard H. King

ATTORNEY.

United States Patent Office 3,440,658
Patented Apr. 22, 1969

3,440,658
DUAL BAND COPLANAR DIPOLE ARRAY WITH DISC TYPE DIRECTOR
Richard D. Bogner, 4 Hunters Lane, Roslyn, N.Y. 11576
Continuation-in-part of application Ser. No. 503,238, Oct. 23, 1965. This application Apr. 17, 1967, Ser. No. 642,989
Int. Cl. H01q *11/10*
U.S. Cl. 343—792.5                                    7 Claims

ABSTRACT OF THE DISCLOSURE

Disc-rod antennas suitable for UHF-TV reception and combined UHF-VHF-TV antennas employing disc-rod directors are disclosed. At least one disc between a quarter and a half of a wavelength in diameter is placed in front of an end fire dual band antenna to improve directivity.

---

This application is a continuation-in-part of my copending application for Broadband TV Antenna filed on Oct. 23, 1965 and assigned Ser. No. 503,238 now abandoned.

This invention relates to broadband high gain antennas and, in particular, to such antennas suitable for UHF-TV receiving applications, but not limited thereto.

For certain applications, it would be desirable to employ a simple, low cost antenna which has relatively high gain, therefore high directivity, over a large frequency band. Such an application would include, for example, UHF television, which covers a 1.9:1 band of frequencies. In general, not only is relatively high gain or large capture area sought, but increasing gain with frequency, ideally at 6 db per octave to achieve constant capture area with frequency, is desired. Capture area is the equivalent of effective area, in square feet, transverse to the direction of arrival of a signal, in which area that signal is intercepted and converted to power at the antenna output terminals. One type of antenna which achieves this desired performance is the paraboloid when operating in a region in which the broadband feed, or primary radiator, is small with respect to the size of the paraboloid. However, the paraboloid antenna is not a practical choice for commercial home television applications for reasons to be explained hereinafter. It is also desirable that an antenna of this class be light-weight, achieve gain values in the 10 to 20 db above isotropic range, be simple to bipolarize or circularly polarize, present very low total and unbalanced area to wind even when covered with ice, and be fed with good impedance properties directly by coaxial or two wire balanced transmission line. The paraboloid and similar antennas which physically fill a constant area broadside to the beam direction, lack many of these properties, as compared to certain end fire antennas. Paraboloids present many practical problems for the UHF-TV application: They require use of large curved surfaces with the curve held to better than $\frac{1}{16}$ to $\frac{1}{32}$ wavelength of a true paraboloid in every plane, with no opening in the surface greater than these same parts of a wavelength, and they must be at least three to four wavelengths in diameter, to achieve close to their predicted performance. An antenna achieving these characteristics in a 48″ size, even in quantity production of a very simple form, would in today's economy cost the consumer in excess of $50.00. To reduce the price, it has been common practice in designing TV receiving antennas for home use to violate the above requirements by using paraboloids which are much more open and physically smaller than allowable by good design practice, and of such construction that the required tolerances are not generally held in shipment or practical use, and therefore fail to meet in many cases the published optimum gain values. The antenna described in this disclosure may be manufactured under broad and liberal tolerances and, even in its simplest form, actually achieves and maintains the theoretical optimum performance of a good quality 48″ dia. paraboloid, at a selling price lower than that of modest performance commercial paraboloid types.

Another antenna achieving this performance which is in current commercial use consists of a flat array of, say, 12 dipoles, in a 3 x 4 array. Such a device of proper mechanical construction would be comparable in cost to the paraboloid because it involves 12 separate radiating elements, and transmission line and power dividers to interconnect each to a single output. Flatness of the entire array, and close uniformity and symmetry of all dipoles and line, is required to achieve even close to theoretical performance. In order to reduce cost to achieve a commercially acceptable sales price, thin wire dipoles and open wire transmission line and power dividers are used, making maintenance of good performance questionable even initially, no less under conditions of ice, snow, wind, rough handling, etc.

The art has always assumed that the end fire type antenna lacked the capability to achieve, simultaneously, both high gain and large bandwidth; logarithmically periodic (LP) end fire types have been used to achieve constant, relatively low gain of the order of 8–10 db (and therefore decreasing capture area with increasing frequency); or Yagi, ladder, or disc types have been used to achieve higher gain values (to over 20 db), but restricted to narrow frequency bands. The Antenna Handbook, 1st Edition, edited by Dr. H. Jasik and published by McGraw-Hill, Inc., states, in Chapter 16, that the best obtainable bandwidth of these latter end fire types, if operating near maximum gain for length, or optimum design, is about ±10%, or 20%, between frequencies at which the gain is 3 db down from peak, using unmodulated dimensions, and perhaps 30% maximum using more expensive and critical modulation of spacing and/or diameter. Further improvement in bandwidth is obtainable only at considerable sacrifice of peak gain for an antenna of a given length.

Accordingly, it is an object of this invention to provide an improved high gain antenna which provides good performance over the entire UHF-TV band.

Still another object of this invention is to provide a low cost antenna having high gain over the entire UHF-TV band.

Another object of this invention is to provide a high gain broadband antenna of simple construction.

A further object of this invention is to provide an antenna suitable for use at TV frequencies which may be manufactured by simple manufacturing techniques.

A still different object of this invention is to provide a high gain broadband antenna susceptible of mass production technique and which does not require maintaining of close manufacturing tolerances.

A different object of this invention is to provide a high gain antenna capable of use at VHF-TV, FM and UHF-TV frequencies having a single output for connection to a transmission line leading to a receiver.

A further object of this invention is to provide a high gain broadband UHF antenna which may be employed in conjunction with high gain VHF and FM antennas in a common structure.

Still a further object of this invention is to provide an improved high gain broadband antenna capable of being readily field directed.

Still a different object of this invention is to provide a pre-assembled high gain broadband antenna which may be shipped in a condensed volume and which may be readily erected in expanded form.

A still different object of this invention is to provide an improved high gain broadband low cost antenna which can be efficiently employed in a multiple array.

These and other objects, features and advantages of the invention will, in part, be pointed out with particularity and will, in part, become obvious from the following more detailed description of the invention, taken in conjunction with the accompanying drawing, which forms an integral part thereof.

In the various figures of the drawing like reference characters designate like parts.

In the drawing:

FIG. 4 shows schematically a three position switch for 2 wire transmission line.

FIG. 5 is a schematic showing of an alternative method of combining two wire lines to a single two wire line output.

FIGS. 6A and 6B are respectively a pictorial view, and a side plan view, of one form of a VHF television receiving antenna as described herein.

FIGS. 7A, 7B and 7C are respectively a pictorial view, and a side elevational view and a top plan view of another form of VHF television receiving antenna as described herein.

FIGS. 8A and 8B are respectively pictorial and plan views of a combined VHF and VHF collapsible indoor television receiving antenna.

FIG. 9 is a pictorial showing of a composite UHF and VHF receiving antenna.

FIG. 10 is a pictorial showing of a composite UHF and VHF receiving antenna arranged to receive combined UHF and VHF horizontally polarized outputs.

FIG. 11 is a pictorial showing of another composite UHF and VHF receiving antenna.

Figure 1:
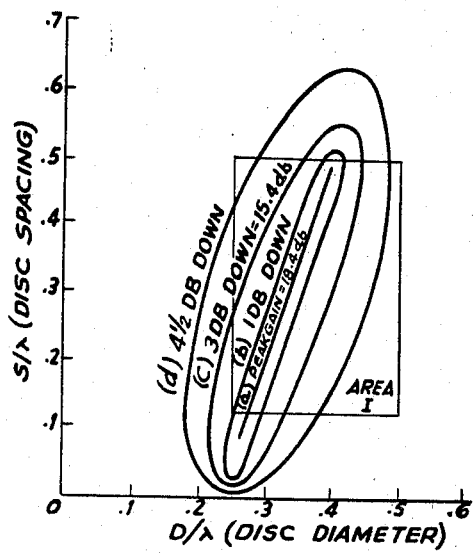
FIG. 1 is a graph showing measured contours of constant gain for an 8 wavelength long antenna of the disc-on-metal-rod type, plotted as a function of disc diameter and spacing between discs.

I have disclosed in my prior patent U.S. 2,955,287 that surprisingly good performance can be obtained from an end fire antenna using plates deployed before a launcher if, in general, the plates fit within a circumscribing cylinder greater than $\frac{1}{4}\lambda$ and less than $\frac{1}{2}\lambda$ in diameter, and the spacing between plates is between $\frac{1}{8}\lambda$ and $\frac{1}{2}\lambda$. More particularly, it is shown in the said patent that, for a given length, launcher, support means, and substantially uniform diameter and spacing of round discs, the maximum gain for any disc spacing chosen occurs for one particular diameter, and this gain is high related to the length if the spacing and diameter are within the stated ranges, and is about $$\left(\frac{7l}{\lambda}+g_1\right)$$

in power, where $l$ is the length of the element, $\lambda$ is the wavelength and $g_1$ is launcher gain in power units. FIG. 1 demonstrates this relationship. FIG. 1 is a graph showing measured contours of constant gain for an $8\lambda$ long antenna of the round disc-on-metal-rod type, plotted as the function of disc diameter and spacing between discs. Area I is bounded by $S/\lambda=\frac{1}{8}$ and $\frac{1}{2}$, and $D/\lambda=\frac{1}{4}$ and $\frac{1}{2}$. Only operation along line ($a$) allows achievement of the maximum gain of 18.4 db above isotropic. For this example, $d=0.05\lambda$. The entire set of curves shifts to the left or right as the diameter of a metal tube support rod coaxial with the discs decreases or increases, but for any support tube size the diameter must be in the specified range to achieve maximum gain. In the said patent no consideration was given to bandwidth, or the rate of fall of gain from this maximum value, as wavelength is raised or lowered. Only the surprisingly high gain for a given length, and the excellent performance when arrayed, in the areas claimed, were considered. In the foregoing "$d$" is the diameter of an electrically conductive support rod. Where the support rod is an insulator $d$ is, of course, zero.

I have discovered that under a certain combination of conditions an unexpectedly large bandwidth, or spread between frequencies, at which the gain is 3 db down from the peak gain, and simultaneously an unexpectedly large bandwidth in which the capture area is very close to constant, can be obtained while maintaining the high peak gain level of $$\left(\frac{7l}{\lambda}+g_1\right)$$

and therefore very high efficiency. The bandwidth obtainable between 3 db points is as high as 50% to 90% depending on antenna length, compared to the commonly accepted 20% maximum, and the bandwidth obtainable in which the capture area is almost constant is greater than one octave, or 2:1 in frequency, which covers for example the entire UHF television band. This performance is, furthermore, obtainable using a very simple low cost antenna design easily and practically adaptable to commercial TV receiving antenna applications. The bandwidth obtainable depends upon the electrical length of the antenna at the frequency at which maximum gain occurs (F max. or F$m$), and upon the gain and other properties of the launcher used. The value of maximum gain obtainable at the frequency of highest gain depends on the length and the launcher gain, and is generally about $$\left(7\frac{l}{\lambda}+g_1\right)$$

for optimum design, where $g$, the launcher gain, and the total gain are both stated in power units. The power gain of the broadband launchers used is generally in the range 5 to 15, whereas the peak power gain values for the combined launchers and end fire structures are generally between 25 to 100. In general, the bandwidth drops as gain increases, such that the product of voltage gain (the square root of power gain) and percent bandwidth is close to constant, and is about 4½ in value.

This surprisingly large bandwidth has been observed, however, only when the disc diameter D minus the supporting rod diameter $d$ (i.e. $D-d$) is about $\lambda/4$ at F$m$, the frequency of maximum gain, or $D-d=\lambda_m/4$ (where $\lambda_m$ is the wavelength at F$m$) and the spacing between discs is less than $\lambda_m/2$. In general, $d$ is small, so that D is close to $\lambda_m/4$.

Figure 2:
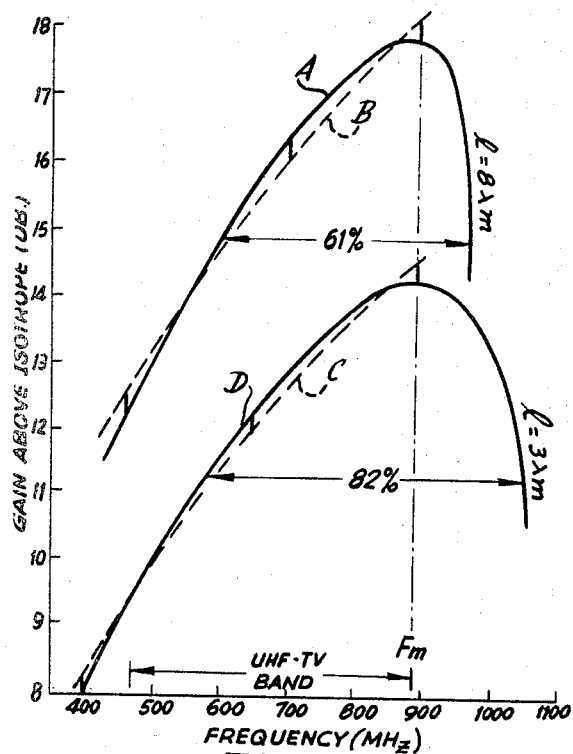
FIG. 2 is a graphical representation of the measured gain of two different disc-on-rod antennas plotted against frequency, and for comparison the theoretical gain of a common 50% efficient paraboloid antenna.

FIG. 2 is a graphical representation of the measured gain of two different disc-on-rod antennas plotted against frequency, and for comparison the theoretical gain of 50% efficient paraboloid antennas. Curve A is the gain of an antenna $8\lambda$ long at the frequency of maximum gain, and curve B is the gain of a 48″ diameter paraboloid. Curve C is the gain of a 33″ dia. paraboloid and curve D is the gain of an antenna $3\lambda$ long at F max. In both cases the peak again occurs at F max.=890 mc. which is the high end of the 470 mc. to 890 mc. UHF television band. The upper curve was measured using an antenna $8\lambda$ long at F$m$, or $l=8\lambda_m$; the peak gain is 17.9 db=61 in power, which is $7l+5$, where 5 (=7 db) is the launcher gain. The 3 db down level is at 14.9 db, which occurs at 965 mc. and 600 mc., or a 61% band. The theoretical gain of a 50% efficient 48″ paraboloid is plotted as a dash line B, and it may be seen that the measured gain of the end fire antenna follows this very closely and is within ¼ db (5%) of it between 460 mc. and 892 mc., a 94% band. For this antenna, S is $0.215\lambda_m$, $d$ is $0.07\lambda_m$, $D-d=0.25\lambda_m$, and $D=0.32\lambda_m$. The lower curve is for a $3\lambda_m$ long antenna. The 3 db band is 1050 mc. to 580 mc., or 82%. The band within ¼ db of a 33″ paraboloid is 890 mc. to 394 mc., or 126%. Here, $S=0.225\lambda_m$, $d=0.05\lambda_m$, $D-d=0.25\lambda_m$, and $D=0.30\lambda_m$. In general the ratio of the bandwidth within ¼ db of constant capture area and the 3 db bandwidth is about 1½ (1.54 in both examples here). The maximum (voltage gain)×(3 db bandwidth) product is about 5 (4.85 for the 8λ antenna, 4.17 for the 3λ antenna).

Assuming that an 89% constant area bandwidth is required (UHF-TV band) at least then an 89/1.54=58% 3 db bandwidth is required. The highest peak gain for which this can be obtained can be determined from the relationship $$5=(.58)\times(G_v) \text{ or } GV=8.6;\ G_p=Gv^2=75=18.7 \text{ db}.$$

Therefore, using the minimum $g_1$ of 5, $$l \max.=\frac{75-5}{7}=10\lambda_m$$

or $10\lambda_m$ is the longest element which can meet the minimum UHF-TV bandwidth. ($G_v$ is voltage gain, $G_p$ is power gain).

Figure 3:
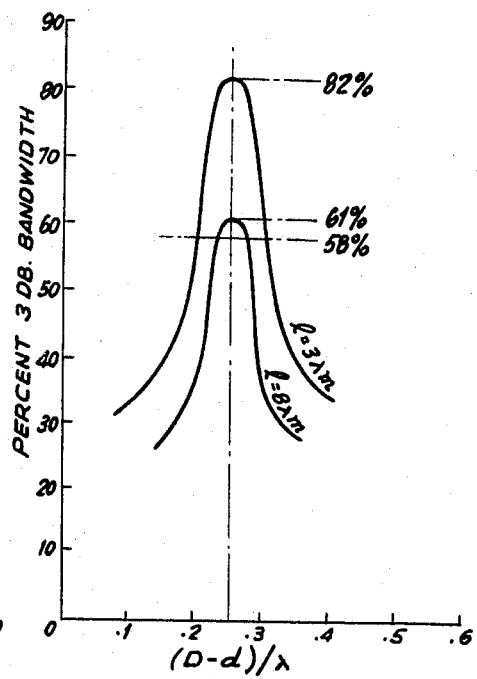
FIG. 3 shows graphically, for the antennas of FIG. 2, the 3 db down bandwidth as a function of $(D-d)\lambda$, where D is the disc diameter and d is the rod diameter in wavelengths at F maximum.

FIG. 3 shows the 3 db down bandwidth as a function of $(D-d)/\lambda$, where D is the disc diameter and $d$ the rod diameter in wavelengths at F max., for the two antennas of FIG. 2. The curves cover only the conditions in which the max. gain $$\left(\frac{7l}{\lambda}+g_1\right)$$

is obtained at F$m$. A different disc spacing, of less than $\lambda_m/2$, is required for each value of $D-d$, to obtain peak gain at F$m$, as shown in FIG. 1. FIG. 3 shows clearly that a relatively sharp bandwidth peak occurs at $$D-d=\tfrac{1}{4}\lambda_m$$

To be above 58% bandwidth, for an 8λ antenna, $D-d$ must be between $.23\lambda$ and $.27\lambda_m$, and for a 3λ antenna, between $.20\lambda_m$ and $.30\lambda_m$. Assuming a straight line relationship:

$$\left(.25-\frac{.16}{l}\right)\leq\frac{D-d}{\lambda_m}\leq\left(.25+\frac{.16}{l}\right)$$

(Eq. 1) and $l\leq10\lambda_m$, for 58% bandwidth. In Eq. 1, $l$ is in wavelengths at F$m$. Eq. 1 gives the allowable range of $D-d$ to obtain greater than 58% bandwidth for an antenna of length $l$.

It has been found that $d$ must be less than about $\lambda_m/8$ to maintain full bandwidth. $d$ may vary along the length of the antenna, usually for mechanical reasons, and if it does $(D-d)$ must meet the above criterion for each section.

Various broadband launchers in the 5 to 15 gain range may be used, provided they are light, simple, inexpensive, and easily matched to 300 ohm 2 wire balanced or 75 ohm coaxial unbalanced transmission line. Such launchers include log periodic types, single "fat" or V dipole types, and slots, in general. Log periodic types and slots may be simply used with either 2 wire or coaxial line, but dipoles may be simply used with two wire line only, since a complex balun is required to connect a dipole to coaxial line.

The discs may be round or close to round, e.g. square with cut corners, maltese cross etc., and solid, mesh, wire loops with spokes, or other open or closed shapes. They may also have some depth, e.g., stiffening ribs. The first few discs near the launching end and/or near the radiating end may be somewhat smaller in diameter or different in spacing, or both, for impedance matching purposes. In designing an antenna of this type, it is necessary to vary the spacing between all discs, within the allowable range, to achieve the required gain over the required band, and then to experimentally determine what change, if any, in diameter and spacing of the first and last few discs provides an improvement in gain and/or VSWR for the particular launcher chosen. No such diameter reduction or spacing change in the first and/or last few discs may be necessary if the gain is within ¼ db (which is the best normal measurement accuracy obtainable in this gain range) of $$\left(\frac{7l}{\lambda_m}+g_1\right)$$

at F$m$, and the VSWR is under about 2:1, without such reduction or change.

A peculiar characteristic of transmission at UHF and higher frequencies (above 300 mc.) which is much less pronounced at VHF and lower frequencies is a tendency for the polarization at a receiving location to differ markedly from the transmitted polarization. Commercial TV in the U.S. is transmitted in horizontal polarization, but reception at any particular location, time, and channel may be best if the receiving antenna polarization is ±45° linear, right or left hand circular, or even vertical, as examples. Since the antenna described herein is identical for two orthogonal linear polarizations, use of a launcher which is in fact two orthogonal linearly polarized launchers allows any polarization to be chosen for entry to the receiver. This choice may be made at the antenna by proper interconnection between orthogonal dipoles, or, by running two lines to the recever locaton, a switch may allow choice to be made there and polarization easily varied by the operator. For example, if launcher dipoles are oriented vertically and horizontally, then connecting the horizontal line to the receiver gives that polarization; connecting the vertical line gives that polarization; connecting the two in parallel with equal length gives +45° polarization, while with 180° difference in length it gives −45° polarization, with 90° difference in length right circular polarization, and with 270° difference in length left circular polarization; in theory it is possible to exactly match any linear, elliptical or circular polarization. In practice, however, it appears unnecessary, for TV applications, to use more than 3 positions on a switch, probably horizontal, vertical, and the two in parallel, as in FIGURE 4. A telescoping section on one two wire line to vary the length about 18″ would provide a more than adequate control, as shown in FIG. 5.

FIG. 4 shows schematically a three position switch for two-wire transmission line, only one line being shown for clarity. This switch combines the outputs of two-wire line 1 and two-wire line 2 into a single two-wire line 12. Line 1 has contacts at points 13 and, through another very short line 4, point 5. Line 12 has contacts at points 14, and, through another short line length 3, point 6. The movable section consists of line 10, split 9, and contacts 8 and 7, and this section pivots about point 11, assuming the center position, or the right hand position "a" or the left hand position "b." In the center position points 5 and 8, and points 6 and 7, are in contact. In the right hand position points 14 and 8a are in contact; in the left hand position, points 13 and 7b are in contact. Line 1 is the two-wire line from the horizontally polarized dipole of the antenna, line 2 from the vertical dipole. The lengths 3 and 4 are very much smaller than $\lambda_m$, say ½″ in UHF-TV use. 12 is the output two-wire line to the receiver. Only the upper deck of two decks, one for each wire pair, is shown in the figure. The switch in the extreme left position "b" connects the receiver to line 1 for horizontal polarization; extreme right position "a" to line 2 for vertical polarization; in the center position lines 1 and 2 are added in parallel to achieve 45° linear polarization.

About ½ db loss is involved in this latter condition due to impedance mismatch through the T.

FIG. 5 shows lines 1 and 2 connected to a T and output line 15. This system is shown as 2-wire line, but may be also coaxial. Member 18 comprises a telescoping tube section 16 and 17 of line, about 18" long. Varying this length changes the polarization at 15.

The mast which supports the antenna is generally attached to the disc support tube at the center of mass of the antenna, which is of course forward of the launcher. If metallic, this mast must in theory be normal to the received electric vector to have no deleterious effect on signal level. While this is normally the case in TV for horizontal transmit and received polarization and a vertical mast, reception of any other polarization, as described above, ideally requires the vertical mast to be either placed rearward of the launcher, or made of a nonconductor in the uppermost section nearest the antenna. It has been found, however, that the effect of a metallic mast parallel to the electric vector and connected to the disc support rod at the midpoint, is quite small for the antenna described, the gain reduction generally being less than 1 db.

Suitable low cost UHF television antennas designed to receive linear (horizontal) polarization are shown in FIGS. 6 and 7. In all cases, the order of magnitude of the dimensions is: disc diameter D about 4½", rod diameter $d$ about 1", and disc spacing S about 3". The discs are held and spaced by various means. Total lengths up to 12 feet are conveniently employed.

FIGS. 6A and 6B are pictorial and plan views, respectively, of one form of UHF television receiving antenna as described herein. The output is in the form of a coaxial transmission line of outer conductor 1a and center conductor 2a, connected to a logarithmically periodic (LP) dipole structure 23. The two LP sections are joined to each other and to the metal rod 25 by a non-metallic block 24. Smaller start and end discs 26 and 29, and discs 27, are deployed along rod 25. The structure is supported by rod 28.

FIGS. 7A, 7B and 7C are pictorial, side elevational plan views, respectively, of another form of UHF television receiving antenna as described herein. The output is in the form of a two-wire transmission line 31, connected to horizontal bow tie dipole 34. Dipole sections 34a and 34b are separated and supported to rod 36 by non-metallic block 5, and the two wires of line 11 are connected to 34a and 34b respectively. Reflector 31', consisting of rods 32 and cross members 33, is connected to rod 36, as are discs 37, 38 and 39, and support rod 40.

It is often required that a single antenna structure provide reception over both the VHF-TV and UHF-TV, and sometimes also the FM, frequency bands. The VHF and FM bands are within the frequency range 54 mHz. to 216 mHz., and therefore the shortest VHF-FM wavelength is over twice the longest UHF wavelength. Since the UHF antenna disclosed here can achieve quite high gain with a maximum launcher dimension of about 13", which is less than λ at 216 mHz., this UHF antenna using such a launcher can be used in combination with VHF-FM antennas to provide a composite single antenna with excellent UHF performance. It is required that the VHF antenna be located entirely behind the UHF launching point and the UHF and VHF inputs be run separately or be combined with a diplexing filter. Almost any type of VHF-FM antenna may be used in this way. FIGS. 8A, 8B, 9, 10, 11 and 12 show various versions of such combinations. In these embodiments the UHF ground planes 53, 68 and 76, respectively, serve as a single plate director for the VHF band. The plate should have a major dimension of about λ/4 for the frequencies of the high TV band (Channels 7–13).

FIGS. 8A and 8B are pictorial and plan views of a combined VHF and UHF collapsible indoor television receiving antenna. UHF LP dipole 41, VHF telescoping dipole 45, disc support rod 46, and mounting post 43, join to non-metallic block 42. Two-wire transmission line 42' is the combined outputs of the UHF and VHF antennas. Rod sections 50 and 48 telescope into section 46, discs 47, 49 and 51 moving together. Stand 44 holds the antenna upright.

FIG. 9 discloses a composite VHF and UHF receiving antenna arranged for separate horizontally polarized outputs 60 for VHF, and 59 for UHF. Metal rods 51 and 52, and non-metal blocks 55 and 56, form a VHF double V antenna and is in common use. A UHF antenna consisting of rod 57, ground screen 53, bow tie dipole 54, and discs 58, is mounted coaxial with and forward of the VHF antenna.

FIG. 10 shows a composite VHF and UHF receiving antenna arranged to receive combined VHF and UHF horizontally polarized outputs at two-wire line 64, which runs down mast 67 and into a TV receiver. Mounted on metal pole 61 are VHF dipoles 62, VHF reflector 63, VHF directors 64, and VHF output line 65, forming a VHF antenna of conventional design, and ground screen 68, bow tie dipole 69, dielectric block 70, discs 72, and output line 71, forming a UHF antenna as described herein. Braces 66 add structural rigidity. Lines 65 and 71 are combined in diplexing filter 73 to provide a combined VHF-UHF output 64.

FIG. 11 shows a composite VHF and UHF receiving antenna arranged to receive VHF signals of horizontal polarization by use of VHF logarithmically periodic V dipole array 75 and multipolarized UHF signals by use of ground screen 76, horizontal bow tie dipole with arms 77 and 78, vertical bow tie dipole with arms 79 and 80, and discs 81 on rod 82. Mast 83 supports both antenna.

Figure 12:
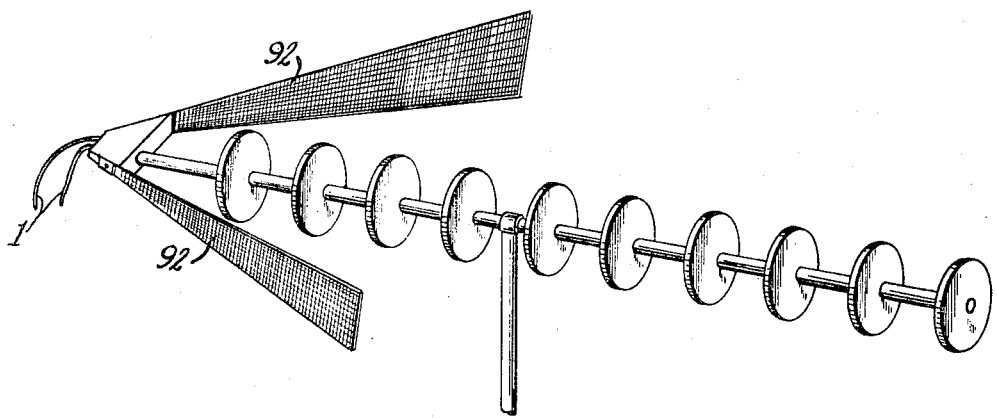
FIGS. 12, 13 and 14 are pictorial showings of an antenna requiring but one electrical transmission line and which is suitable for UHF-TV or UHF-VHF TV applications.
Figure 13:
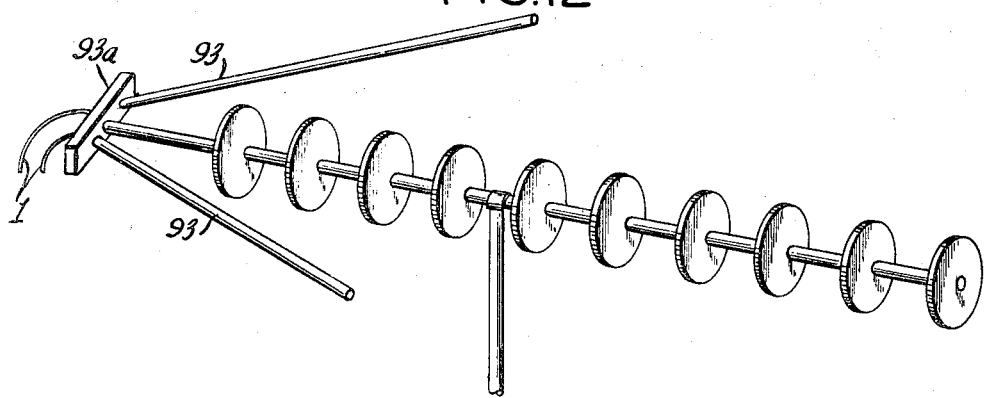
Figure 14:
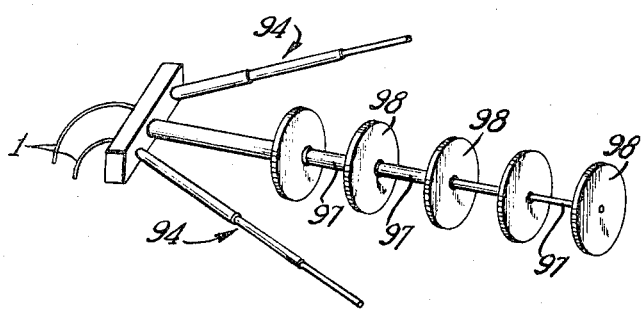

FIGS. 12, 13 and 14 show other embodiments of even simpler form, which may be used for UHF only, or VHF, FM and UHF using a single electrical connection of twin line 1 for all bands. The V arms 92, 93 and 94 used to launch the disc-rod structure 95 and 96 are in this case more than a wavelength long at UHF, and therefore at least a substantial fraction of a wavelength at VHF.

In FIG. 12 the launcher 92 is shown as a mesh structure, whereas, in FIG. 13 a simple rod 93 is employed. It is to be noted that rods 93 are pivotable about rivets 93A as to permit folding of the structure when the device is employed as an indoor antenna or for convenience in shipping. Thus, the installer need only open the arms and lock them in place by means of conventional latching means commonly employed on commercial TV antennas.

Still an even more compact embodiment is shown in FIG. 14, wherein telescoping rods 97 carry the discs 98 and launcher rods 94 are also of the telescoping type, thus providing a very compact structure for purposes of shipping or storage. This latter is an important feature for indoor TV applications.

Figure 15:
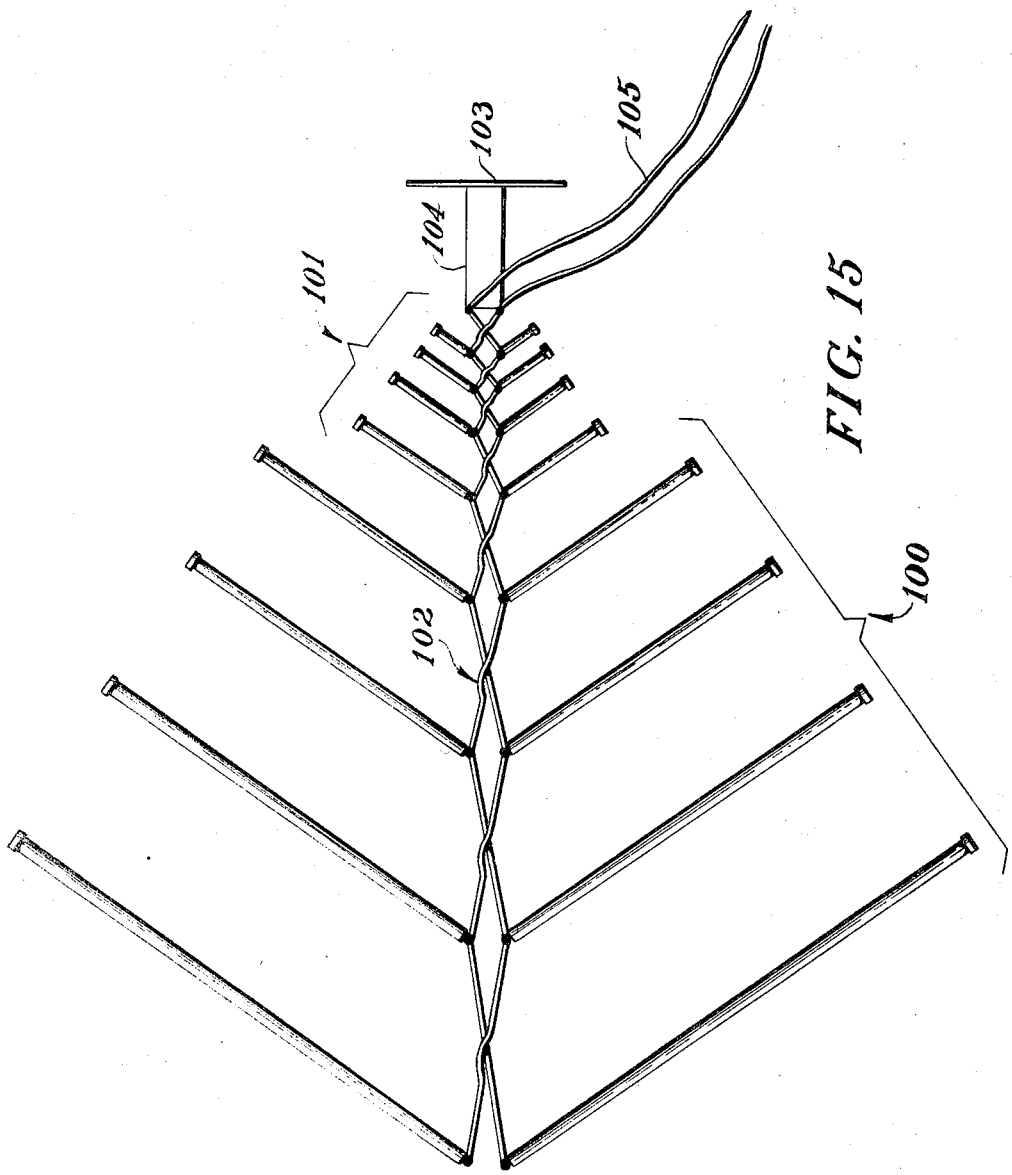
FIG. 15 is a plan view of a composite UHF and VHF receiving antenna.

FIG. 15 shows a composite VHF and UHF receiving antenna arranged to receive VHF signals of horizontal polarization by use of a V-dipole array 100 and a UHF V-dipole array 101. In this embodiment, by way of example, both antennas are of the logarithmically periodic type in which both dipole length and spacing vary logarithmically. However, the two V-dipoles need not be of the same type and either the spacing and/or length can vary. The two V-dipole arrays are electrically and mechanically connected together in one structure by alternately transposed feed line 102, and fed at the smallest dipole at the front end of the UHF section utilizing a single feed line to serve both VHF and UHF portions. One or more plates or discs 103 may be used mounted as directors in front of the antenna utilizing an electrically non-conductive support member 104 fixed to the structure.

An alternate feed construction utilized in the receiving antenna industry which achieves the same performance dispenses with the actual line transposition between alternate dipoles and substitute alternate connection of dipole arms to upper and lower sections of the feed line respectively.

Although a plurality of discs are preferred, as discussed heretofore, it has been found that for many applications as, for example, for television receiving antennas for locations within 40 miles from an UHF station, a single disc is adequate.

In the accompanying claims the disc-one-rod portion is referred to as a slow wave structure. The term disc is intended to encompass solid and open mesh plates of diverse shape.

As is well known in the art, the radiation properties of an antenna are independent of whether it is used for transmission or reception. Thus, when reference is made to a receiving antenna, it is to be understood that the device may also be used as a transmitting antenna.

The antenna beam is defined as the direction of the peak intensity of the radiation pattern.

Having thus disclosed the best embodiment of the invention presently contemplated, it is to be understood that various changes and modifications may be made by those skilled in the art without departing from the spirit of the invention.

What is claimed is:
1. In combination:
(a) a broadband antenna adapted to receive energy of wavelengths between $\lambda_1$ and $\lambda_2$, comprising:
  (1) a first antenna having a maximum gain occurring at $\lambda_m$ which is between $\lambda_1$, and $\lambda_2$, and having a feed point in front thereof along a principal axis extending in the direction of the antenna beam;
  (2) at least one electrically conductive plate disposed along the principal axis and normal thereto and in front of the feed point, said plate being substantially symmetrically about any plane containing said axis which plane is normal to electric vectors to which the said first antenna is maximally responsive, said plate having a major dimension D in the direction of said electric vector of greater than $\lambda_m/4$ and less than $\lambda_m/2$; and
(b) a second antenna designed to receive energy of wavelengths between $\lambda_3$ and $\lambda_4$ where latter wavelengths are longer than wavelength $\lambda_1$ to $\lambda_2$, the two antennas being arranged in cascade along the principal axis, the said second antenna being rearward of said first end-fire antenna relative to the direction of the antenna beam; and
(c) feed means for feeding said antennas in common to said feed point.

2. The antenna of claim 1 wherein said conductive plate is a disc.

3. A broadband end-fire antenna adapted to receive energy wavelengths between $\lambda_1$, and $\lambda_2$, comprising:

(a) first front fed multiple driven dipole array wherein the dipole lengths progressively decrease along a principal axis toward a feed point whereby the antenna beam is directed along a principal axis in a direction extending from the larger of said dipoles toward the smaller of said dipoles;
(b) a two-wire feed line connected to the dipoles of said dipole array with a transposition between succesive dipoles;
(c) means to connect a two-wire feed line to said transposed feed line at the feed point;
(d) at least one electrically conductive plate disposed along the principal axis and normal thereto and in front of the feed point, the maximum gain of said antenna occurring at $\lambda_m$ which is between $\lambda_1$ and $\lambda_2$, said plate being substantially symmetrical about any plane containing said axis which plane is normal to electric vectors to which the antenna is maximally responsive, said plate having a major dimension D in the direction of said electric vector of greater than $\lambda_m/4$ and less than $\lambda_m/2$; and
(e) a second antenna designed to operate at longer wavelengths, the two antennas being arranged in cascade along the principal axis, the said second antenna being rearward of said first dipole array relative to the direction of the antenna beam, the combined antennas being fed in common by said two-wire line.

4. The antenna of claim 3 wherein said conductive plate is a disc.

5. The antenna of claim 3 comprising two V-dipole arrays electrically and mechanically connected together by said periodically transposed feed line, said V-dipole arrays being composed of a plurality of dipoles whose length and spacing vary in a decreasing fashion from dipole element to successive dipole element in the direction of the beam.

6. The antenna of claim 3 wherein said antennas are of the same type.

7. The antenna of claim 3 wherein the length and spacing of successive dipoles of both of said antennas are logarithmically related.

References Cited

UNITED STATES PATENTS

| | | | |
|---|---|---|---|
| 2,663,797 | 12/1953 | Kock | 343—785 |
| 2,955,287 | 10/1960 | Bogner | 343—785 |
| 3,086,206 | 4/1963 | Greenberg | 343—815 |

ELI HEBERMAN, *Primary Examiner.*

U.S. Cl. X.R.

343—815, 833